(No Model.)
E. M. WILBOR.
Sheet Metal Cutter.
No. 238,739. Patented March 8, 1881.
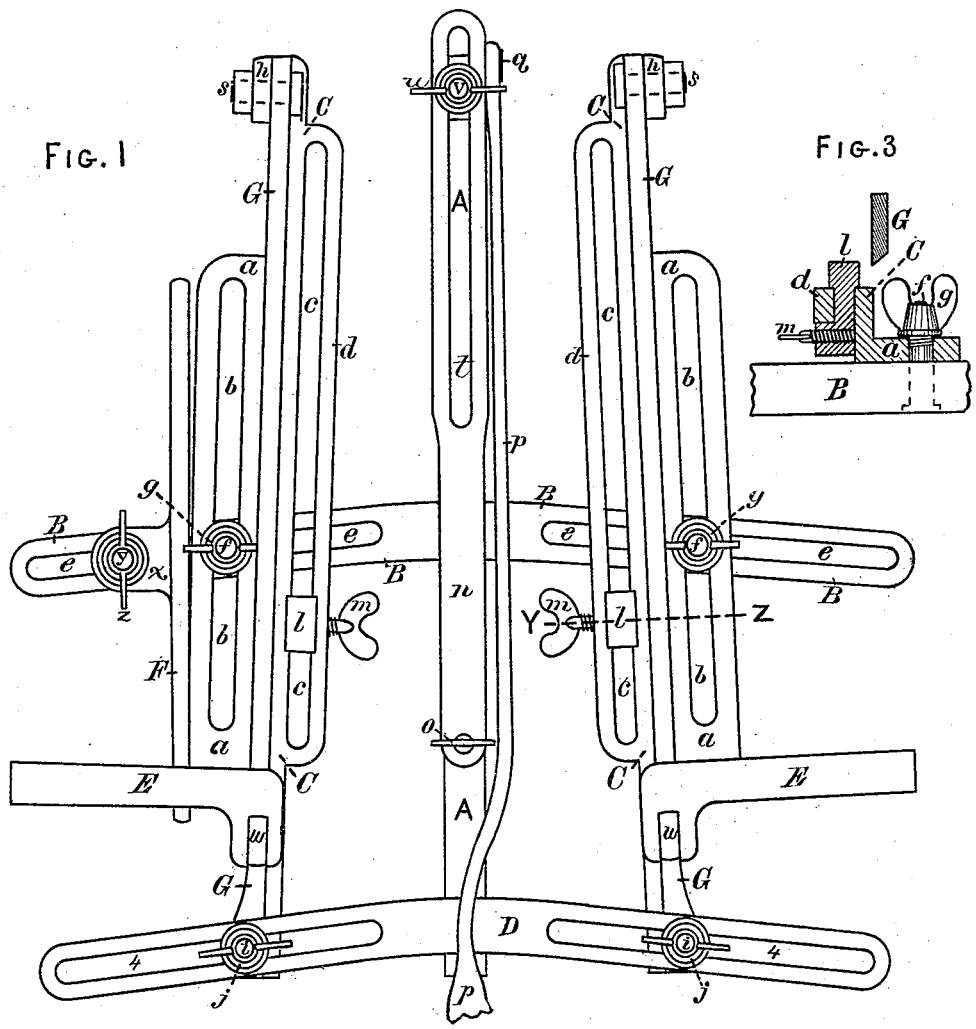
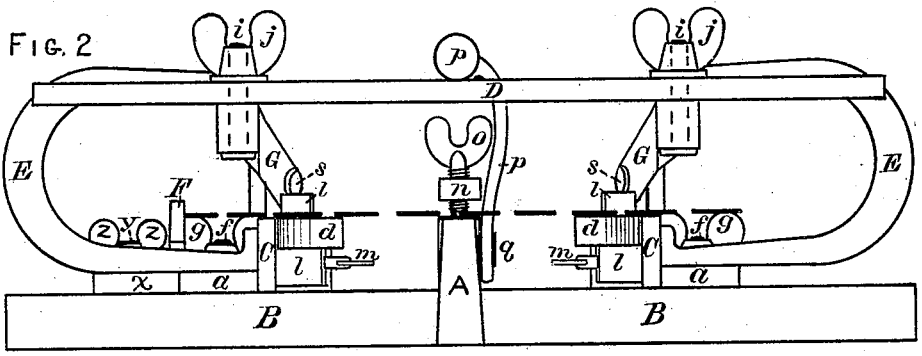
WITNESSES:
John T. Whitman
Herbert T. Whitman
INVENTOR:
Elijah M. Wilbor
By Porter & Hutchinson
Attys.
N. PETERS, PHOTO-LITHOGRAPHER, WASHINGTON, D. C.

UNITED STATES PATENT OFFICE.

ELIJAH M. WILBOR, OF TAUNTON, MASSACHUSETTS.

SHEET-METAL CUTTER.

SPECIFICATION forming part of Letters Patent No. 238,739, dated March 8, 1881.

Application filed December 14, 1880. (No model.)

*To all whom it may concern:*

Be it known that I, ELIJAH M. WILBOR, of the city of Taunton, State of Massachusetts, have invented an Improved Sheet-Metal Cutter, of which the following is a specification.

This invention relates to that class of machines which are used for cutting strips or bands of metal to a uniform length, and especially for cutting the ends of pan-sections and parts of other vessels which require to be cut at the ends upon oblique lines; and the invention will, in connection with the annexed drawings, be hereinafter fully described, and specifically defined in the appended claims.

Figure 1 is a top or plan view of a machine embodying my invention. Fig. 2 is a front end elevation of said machine as viewed from the lower or near part of Fig. 1, and with the upper or vibrating cutters raised. Fig. 3 is a transverse vertical section taken on line Y Z, Fig. 1, and showing the lower or fixed cutters and the upper or vibrating cutters in section.

In said views A represents a central longitudinal bed-piece, which is either rigidly secured to or formed as an integral part of the slotted transverse bed-bar B, which latter is formed with the longitudinal slots or passages $e\ e$, as shown.

The lower cutters, C C, are each formed or provided upon its outer side with a thinner lateral extension, $a$, wherein are formed the longitudinal passages $b$, as shown in Figs. 1 and 3, while the inner side of each of said cutters is formed or provided with the lateral projections $d$, in which are formed the longitudinal passages $c$, as shown in said Figs. 1 and 3.

The clamping-bolts $f f$, provided with the thumb-nuts $g\ g$, are respectively seated in slots $e\ e$ of bed-bar B and slots $b\ b$ in extensions $a\ a$, as shown, and said bolts, in conjunction with bolts $i\ i$, as will be explained, serve to hold cutters C C at the required distance apart and at the required degree of obliquity relatively to each other.

G G are two vibrating cutters respectively pivoted at their rear ends to lugs $h$ of cutters C C by bolts $s\ s$, as shown in Fig. 1. Upon said cutters G, near the front ends, are formed or secured the guiding-lugs $w$, which extend up through corresponding guiding-slots in the upper ends of the U-shaped supports E E, for the purpose of guiding said vibrating cutters G in their vertical movement relatively to the lower or fixed cutters, C C. Said U-shaped supports E are, at their lower ends, rigidly secured to the front ends of the lateral extensions $a\ a$, as shown in Fig. 2, and so as to move laterally therewith when the cutters C C are adjusted.

D is a cross-bar formed with the longitudinal slots or passage 4 4, which receive the bolts $i\ i$, which pass through the enlarged front ends of cutters C, said bolts, by the aid of thumb-nuts $j j$ thereon, serving to secure the ends of said cutters at the required distance apart, and by means of said bolts $i\ i$, so adjustable in slots 4 4 of bar D, and of bolts $f f$, adjustable in slots $e\ e$ of bed-bar B, said cutters C C, with their respective coacting cutters G G, may be adjusted at the required distance apart and with the desired obliquity relatively to each other.

Two stops, $l\ l$, are arranged to slide in slots $c$, and are locked in position by the set-screws $m$. Said stops extend above cutters C, and serve as stops or gages against which the edge of the sheet of metal is placed when being cut.

A binding-bar, $n$, is secured to bed-piece A, at the rear end thereof, by the screw-bolt V and its locking-nut $u$, said bolt passing through the longitudinal slot $t$ in said bar, as shown in Fig. 1, a thumb set-screw, $o$, being threaded in the front end of said bar $n$, and serving to clamp the metal in place when being cut, as shown by dotted line in Fig. 2.

A gage, F, having a side ear, $x$, through which, and slot $e$ in bar B, the locking-bolt $y$ (having the nut $z$) passes, serves as a stop or gage against which the end of the strip of metal to be cut is placed, as shown in Fig. 2.

A curved handle, $p$, is, at its rear end, pivoted to bar A at $q$, while its front end is rigidly secured to cross-bar D; therefore by taking hold of the front end of said lever or handle $p$ the pivoted cutters G G may be vibrated upon their pivots $s$ as the front ends are raised and lowered by and with cross-bar D.

By means of slots $b$ and clamping-bolts $f$ the cutting-blades may be advanced in front of said bolts to the required distance to receive between said bolts and the front ends of said cutters any desired width of metal; and by means of slots $c$ the stops $l$ may be adjusted at any desired point and locked by the set-screws $m$; and by reason of slot $t$ in binding-bar $n$ the same may be so lineally adjusted that clamping-screw $o$ will bear upon the sheet of metal at the desired point in its width, while gage F, by its locking-screw $y$, seated in slot $e$, may be adjusted at the required distance from the adjacent cutters G G, and parallel or oblique thereto, as may be desired.

The depth of throat of supports E is such that a sheet of metal of a length equal to the greatest capacity of the machine will pass between said supports.

I claim as my invention—

1. The bed B, provided with the slots $e\ e$, the cutter-bars C C, provided with slots $b\ b$, the curved supports E E, secured to bars C C, the hinged cutter-bars G G, engaged and guided by said supports, and the cross-bar D, formed with the slots 4 4, all constructed and combined substantially as specified.

2. In combination with the cutter-bars C C and G G, provided with lineal and lateral adjustment, as described, the slotted extensions $d\ d$, the adjustable locking-stops $l\ l$, seated therein, the lineally-adjustable binding-bar $n$, having the binding-screw $o$, and the laterally-adjustable gage F, all substantially as specified.

ELIJAH M. WILBOR.

Witnesses:
T. W. PORTER,
F. V. WOOSTER.